3,467,490
PRESERVATIVE WRAPPER FOR WOOD POLES, THE PROCESS FOR ITS MANUFACTURE, AND THE METHOD OF USING SAME
Johannes Sommer, Breidenhofer Strasse 36, Haan/Rhineland, Germany
No Drawing. Filed Oct. 24, 1965, Ser. No. 505,063
Int. Cl. B27k *3/12, 3/52, 3/14*
U.S. Cl. 21—7                    12 Claims

ABSTRACT OF THE DISCLOSURE

A wood impregnating wrapper, and method for its use; formed by fusing a paste, comprising a thermoplastic material, mineral oil and wood impregnating salt, on a fleece of glass fibers which is filled with a thermoplastic material so as to form an inherently elastic unit.

---

The invention relates to a process for the manufacture of an impregnating wrapper for wood poles, which serves to protect wood poles set in the ground against rot in the area in contact with the soil, and especially serves for the re-impregnation of poles made of wood for overhead electric conductors.

It is known in the prior art to impregnate wooden poles before they are set in the ground to carry overhead electrical conductors, so as to protect them against rot and furthermore, to re-impregnate such wood poles after they have been standing for a period of time, i.e., to treat them again with an impregnating substance. Overhead conductor poles made of wood are re-impregnated in the soil area by means of so-called lubricant or dry-salt wrappers, which are also known in the prior art.

The prior art wrappers of this sort have the disadvantage that, in addition to the wrapping that serves as the carrier of the impregnating substances and which is laid directly about the wood pole, an additional waterproof wrapper is needed, which envelops the impregnating substance carrier from the outside. The waterproof wrapper serves to prevent leaching of the impregnating substance by ground moisture, thereby permitting the substances to be absorbed more effectively by the wood pole that they are in contact with.

These wrappers of the prior art, however, are too complex in their overall construction, and therefore they are too expensive to manufacture and to use. For example, roofer's felt has been used for the waterproof outer wrapping, but it has the disadvantage that it does not conform itself adequately to the pole.

Wood protecting wrappings are known which consist of pliant bands or sheets of organic plastics of high molecular weight, especially foamed plastics in which known wood protecting agents are embedded and which are added to the plastics before the wrappers are made.

High-molecular substances particularly well suited for the manufacture of the prior-art wrappers comprise polymers or copolymers of, for example, polyvinyl chloride, polyvinyl acetate, polyacrylic esters, polymethacrylic esters or polystyrene, as well as natural or synthetic rubber.

The wood protective agents are dispersed into the high-molecular substances in the same way as is customary in the case of fillers or pigments, as for example, by rolling them into a preferably powdered plastic, at elevated temperatures as a rule, or by mixing them into the fused high molecular substances before it is formed. The substance is then usually formed at elevated temperatures.

These wood protecting wrappings are manufactured, for example, by mixing 333 parts by weight of polyvinyl chloride powder, 333 parts by weight of dibutyl phthalate, 888.8 parts by weight of sodium fluoride, 444.4 parts by weight of sodium bicromate, and 0.8 part by weight of a stabilizer into a uniform mass. This mass is then rolled out by means of a mixing roll at about 165° C. to a band approximately 1 to 3 mm. thick. This band is laminated, also at 165° C., onto a sheet which has been manufactured from 100 parts by weight of polyvinyl chloride, 50 parts by weight of a sulfo acid ester of high hydrocarbons with phenol plasticizer, 1 part by weight of iron oxide pigment and 0.3 part by weight of a stabilizer, and has a thickness of 0.12 mm.

The outer side in the application of these wrappers is to be provided with a water-resistant protective layer, such as a varnish coating or a sheet, especially of plastic, that has been made to adhere to it.

The manufacture of prior art wrappers of this kind is too expensive, and it has been found, in addition, that a plastic sheet will not withstand the temperature of 165° C. required for the lamination and the resultant waste renders the production of the wrapper uneconomical. The application of a water-resistant varnish to the outside of the wrapper is too difficult and therefore too expensive.

The invention is aimed at the problem of eliminating the difficulties encountered in the prior art, particularly the above-noted existing disadvantages, by the use of a manufacturing process that can be performed with simple and inexpensive means, to create an impregnating wrapper for wood poles which better meets the requirements than the wood pole impregnating wrappers known hitherto.

According to the invention, this problem is solved in that hot-forming plastics having mineral oil, especially tar oil, and wood impregnating salts added thereto are fused together with a batting of mineral fibers such as glass fibers which has previously been impregnated with plastic into an inherently elastic whole.

By employing the process of the present invention, the plastic which impregnates the batting consisting of glass fibers combines advantageously into a whole with the hot-forming plastics, together with the additions contained therein of mineral oil, especially tar oil, and wood impregnating salts, and the batting consisting of glass fibers is so imbedded in the plastic mass associated with it that the finished wrapper exhibits a smooth, waterproof, even exterior surface.

In this manner, a one-piece wood protecting wrapper is formed, which, at the same time, constitutes the waterproof outer wrapping and in its entirety has an elastic, stretching characteristic. The impregnating salts cannot sprinkle out of their bond nor can the salt coating itself flake off, no matter how the wrapper is stressed mechanically.

The wrapper of the invention eliminates the need for a separate waterproof outer wrapping. The new wrapper is strikingly simple: it is wrapped around the wood, drawn tight, and cemented or nailed at the seam.

These wrappers can be produced in relatively large rolls and cut to size at the worksite, according to the circumference of the pole. This signifies a further saving of material, because hitherto the prepared wrappers have been either too long or too short, and consequently, had to be kept in stock in various sizes, and even so, they did not always fit at the worksite.

Experiments have shown that the wrapper can be applied very quickly to the pole and conforms well to its shape, even if the surface of the pole is uneven. Due to swelling, the salt particles are desirably released slowly and brought into solution by the moisture in the wood. The dissolved salts migrate into the interior of the wood by diffusion.

The use of a batting of glass fibers which has previously been filled with plastic has the advantage that it does not ignite during the process of fusion into an elastic whole with hot-forming plastics with mineral oil and wood impregnating salts added. Consequently, fire is prevented during the manufacture of the wrapper.

Furthermore, fiber glass is especially resistant, it does not tear, and it is specifically resistant to rotting in the soil area.

Additionally, when the glass fiber has been filled with plastic, it is very flexible so that the finished wrapper conforms to the pole in an especially advantageous manner. Glass fiber batting offers good resistance to mechanical injury and is inexpensive. The wrapper also retains its shape after the impregnating processes, i.e., all the impregnating salts have taken effect, so that even then the wrapper still forms an effective guard in the area of its application against leaching out into the soil.

The new wood protecting wrapper can be manufactured, for example, as follows:

21 parts by weight of polyvinyl chloride powder, 19 parts by weight of tar oil having a boiling temperature range of 200–300° C., and 60 parts by weight of known wood impregnating salts, are mixed into a paste and then applied to a bat made of glass fiber which has previously been filled with polyvinyl chloride, and fused with heat into a unit. Thus, the fleece of glass fibers is previously saturated with the same thermoplastic material that is used in the paste applied to the bat of glass fibers.

In addition to polyvinyl chloride, the following thermoplastic materials, according to the invention, may also be employed to the same effect: polymerizates or mixed polymerizates containing, for instance, polyvinyl chloride, polyvinyl acetate, polyacrylic esters, polymethacrylic esters, or polystyrene, and furthermore, natural rubber or synthetic rubber, all of which are materials known in the art. The following wood-impregnating salts may be employed: for example, salt mixtures containing alkali fluorides, alkali chromates and/or bichromates and arsenates, if necessary, with an addition of organic compounds, such as dinitrophenol and pentachlorophenol, which are also known in the art.

The preserving agent used can be of any of the preserving agents known for use in impregnating wrappings of the prior art, wherein the preserving agent is dispersed in thermoplastic material. The lamina in which the preserving agent is dispersed is a continuous film composed of the tar oil and thermoplastic and the preservative. The film can be about 1–3 mm. in thickness.

The proportions of the materials comprising the lamina containing the wood preservative can vary over wide limits, it being merely desirable tha the proportions be such that the hot-forming plastic is present in an amount sufficient to provide a continuous film of the hot-forming plastic and tar oil, and that the tar oil be present in an amount sufficient to secure good bonding layers, while the preserving agent is desirably present in large amount relative to what can be retained by the tar oil-hot forming plastic layer, since it is the active ingredient. The amount of hot-forming plastic will depend on the particular plastic employed and can readily be determined by simple experimentation. For example, the amount of hot-forming plastic can vary from about 20–30 weight percent of the hot-forming plastic, tar oil, and preserving agent. The tar oil can be in the range of about 20–40 weight percent, on the same basis, while the preservative agent can be present in a range of about 30–70 weight percent. The coating thickness will vary according to the preserving effect desired in the finished wrapper.

Thermoplastic impregnated fiber glass batting can be about 0.3–0.5 mm. in thickness. It serves the function of providing a backing for the fused paste containing the preserving agent, to which the said batting is bonded, and at the same time provides a waterproof covering. The thermoplastic impregnated fiber glass batting is sufficiently flexible and elastic so that the wrapping can be applied tightly about posts and poles and will conform closely to the contour thereof, though there may be irregularities in the wood surface. It is also within the scope of this invention to place the wood impregnating wrapper against a flat wood surface. For example, the wrapper may be placed against a flat wood member and soil or dirt fill piled against the exposed waterproof side so as to press it into better contact with the wood.

Although the invention has been disclosed and described with reference to certain preferred embodiments, it is not intended that the novel process and article of manufacture be limited thereby, but that certain modifications thereof be included within the broad scope of the following claims.

What is claimed is:

1. A method for manufacturing a wood impregnating wrapper comprising fusing a paste comprising a thermoplastic material, mineral oil and wood impregnating salt on a fleece of glass fibers which is filled with a thermoplastic material so as to form an inherently elastic unit.

2. The method of claim 1, where said mineral oil comprises tar oil.

3. The method of claim 1, where said material filling said fleece is selected from at least one member of the group consisting of polyvinyl chloride, polyvinyl acetate, polyacrylic esters, polymethacrylic esters, polystyrene, natural rubber and synthetic rubber.

4. The method of claim 1, wherein the thermoplastic material of said paste is selected from at least one member of the group consisting of polyvinyl chloride, polyvinyl acetate, polyacrylic esters, polymethacrylic esters, polystyrene, natural rubber and synthetic rubber.

5. The method of claim 1, where said first mentioned and second mentioned thermoplastic materials are the same.

6. The method of claim 4, where said mineral oil comprises tar oil.

7. The method of claim 6, where said material filling said fleece is selected from at least one member of the group consisting of polyvinyl chloride, polyvinyl acetate, polyacrylic esters, polymethacrylic esters, polystyrene, natural rubber and synthetic rubber.

8. The method of claim 6, where said first mentioned and second mentioned thermoplastic material are the same.

9. As an article of manufacture, an inherently elastic wood-protecting wrapper comprising a waterproof outer layer of a glass fiber fleece filled with a thermoplastic material having adhered thereto and integral with one surface thereof a wood protecting composition comprising a thermoplastic material wood impregnating salt and a mineral oil.

10. Article of manufacture according to claim 9, wherein the first mentioned thermoplastic material and the second mentioned thermoplastic material are the same.

11. A method for protecting a wood pole set in the ground, comprising wrapping said pole with a wrapper comprising a waterproof outer layer of a glass fiber fleece, saturated with a thermoplastic material having adhered thereto and integral with one surface thereof a wood protecting composition comprising a thermoplastic material, wood impregnating salt and a mineral oil, said composition being in contact with said wood pole set in the ground.

12. Method according to claim 11, wherein the first mentioned thermoplastic material and the second mentioned thermoplastic material are the same.

References Cited

UNITED STATES PATENTS

| | | | |
|---|---|---|---|
| 2,389,870 | 11/1945 | Reevely | 21—7 |
| 2,955,331 | 10/1960 | Nelson | 21—62 |
| 3,234,041 | 2/1966 | Rosecrans. | |

FOREIGN PATENTS

| | | |
|---|---|---|
| 833,818 | 4/1960 | Great Britain. |
| 1,042,107 | 6/1953 | France. |

MORRIS O. WOLK, Primary Examiner

BARRY S. RICHMAN, Assistant Examiner

U.S. Cl. X.R.

21—62, 63; 43—18; 47—24; 106—15; 117—126, 168; 156—185